United States Patent
Boston et al.

(10) Patent No.: US 9,958,060 B2
(45) Date of Patent: May 1, 2018

(54) HYDRAULIC SYSTEM FOR A TORQUE CONVERTER

(71) Applicant: Caterpillar Inc., Peoria, IL (US)

(72) Inventors: James Boston, Peoria, IL (US); Eric J. Manning, Eureka, IL (US); Benjamin D. Nauman, Henry, IL (US)

(73) Assignee: Caterpillar Inc., Peoria, IL (US)

( * ) Notice: Subject to any disclaimer, the term of this patent is extended or adjusted under 35 U.S.C. 154(b) by 57 days.

(21) Appl. No.: 14/962,775

(22) Filed: Dec. 8, 2015

(65) Prior Publication Data

US 2017/0159807 A1   Jun. 8, 2017

(51) Int. Cl.
*F16H 61/14*   (2006.01)
*F16D 48/02*   (2006.01)
*F16H 45/02*   (2006.01)
*F16H 61/02*   (2006.01)

(52) U.S. Cl.
CPC ............ *F16H 61/14* (2013.01); *F16D 25/14* (2013.01); *F16H 45/02* (2013.01); *F16H 61/0267* (2013.01); *F16H 61/142* (2013.01); *F16H 2045/0215* (2013.01)

(58) Field of Classification Search
CPC .. F16H 61/14; F16H 45/02; F16H 2045/0215; F16D 25/14
See application file for complete search history.

(56) References Cited

U.S. PATENT DOCUMENTS

| | | | |
|---|---|---|---|
| 3,241,399 A * | 3/1966 | Fisher | F16H 47/08 137/489 |
| 3,259,218 A * | 7/1966 | Black | F16D 57/04 192/221 |
| 3,985,046 A | 10/1976 | Morris et al. | |
| 4,099,603 A | 7/1978 | Peppel | |
| 8,608,604 B1 | 12/2013 | Jawalkar Nagaraj et al. | |
| 8,960,395 B2 | 2/2015 | Waters et al. | |
| 2003/0042098 A1 | 3/2003 | Takeuchi et al. | |
| 2013/0284009 A1* | 10/2013 | Mitsui | F16H 61/14 91/41 |

(Continued)

FOREIGN PATENT DOCUMENTS

EP   0195295   9/1986
EP   0791768   8/1997

*Primary Examiner* — David J Hlavka
(74) *Attorney, Agent, or Firm* — Leydig, Voit & Mayer, LTD.; Jeff A. Greene (57) ABSTRACT

A hydraulic circuit supplies pressurized hydraulic fluid to and from a torque converter that is operatively associated with a lockup clutch. The torque converter is disposed upstream of an outlet regulator that maintains a predetermined pressure in the torque converter. Power transmission in a powertrain can be directed through the torque converter during a hydrodynamic mode and can be directed through the lockup clutch during lockup mode. To switch between the hydrodynamic mode and the lockup mode, the hydraulic circuit includes a diverter valve to selectively direct pressurized hydraulic fluid between the torque converter and the lockup clutch. When operating in the lockup mode, the diverter valve further diverts hydraulic fluid discharged for the torque converter to bypass the outlet regulator disposed downstream of the torque converter.

7 Claims, 3 Drawing Sheets

(56) References Cited

U.S. PATENT DOCUMENTS

| | | | |
|---|---|---|---|
| 2014/0209425 A1* | 7/2014 | Tsutsui | F16H 61/14 |
| | | | 192/55.1 |
| 2015/0191174 A1* | 7/2015 | Ishikawa | F02D 41/022 |
| | | | 477/54 |
| 2015/0198242 A1 | 7/2015 | Knox | |
| 2017/0009866 A1* | 1/2017 | Herrmann | F16H 61/0206 |

* cited by examiner

HYDRAULIC SYSTEM FOR A TORQUE CONVERTER

TECHNICAL FIELD

This patent disclosure relates generally to a torque converter utilized as part of the powertrain for a machine and, more particularly, to a hydraulic circuit and methodology for actuating the torque converter.

BACKGROUND

A powertrain is the assembly that operatively couples an internal combustion engine or similar prime mover to the driven elements, referred to the load, that are powered by the engine. Powertrains are integral parts of many mobile and stationary machines including, for example, earth moving machines, generator sets, and any other suitable type of engine-powered machines. Powertrains include different components and devices to transmit the rotational motion output from the engine and to adjust the speed, power, and/or direction associated with the motion. For example, to address operational speed and power disparities that may exist between the running engine or prime mover and the driven elements, powertrains may include components like transmissions, which have engageable gears arranged in selectable fixed ratios to increase or decrease speed, and may include torque converters. Torque converts are devices that can provide physical separation between the prime mover and the remainder of the powertrain by forming a fluid coupling between the components. Physically, the torque converter typically includes two rigid, independently rotatable parts, referred to as an impeller and a turbine respectively, that are disposed in a closely spaced arrangement with respect to each other and that are enclosed within a housing that is filled with hydraulic fluid or the like. Rotation of the impeller due to the rotational power input from the engine or prime mover causes the hydraulic fluid to flow within the housing in a manner that forces the turbine to similarly rotate, thereby transmitting power to the driven elements. Torque converters typically include an additional rigid device, referred as a stator, also disposed within the housing that assists in directing the flow of hydraulic fluid in a manner to improve transmitting speed and power through the converter.

Because fluid transmits the rotational motion through the torque converter, the impeller and the turbine can rotate at different respective speeds, an occurrence referred to as slipping or slippage. The hydraulic fluid can dissipate the difference in rotational speed between the impeller and the turbine as friction and heat. This allows the prime mover and the driven elements to rotate at different speeds and, in fact, can completely decouple the prime mover from the driven elements so the prime mover does not stall if the driven elements need to remain stationary. Accordingly, a mobile machine can come to a stop while the engine continues running. However, in many situations, it is desirable to rotate the impeller and the turbine at the same rotational speed and slippage between the components results in efficiency losses. Accordingly, torque converters are often operatively associated with a lockup clutch that can form a rigid, mechanical linkage between the prime mover and the driven elements to improve power transmission efficiency in the powertrain. To actuate the lockup clutch, it may be associated with the same hydraulic system that directs hydraulic fluid to the components of the torque converter. The present disclosure is directed to such a hydraulic system.

SUMMARY

The disclosure describes, in one aspect, a machine including a prime mover for generating a rotational force to power a driven element coupled to the prime mover through a powertrain. A torque converter may be disposed in the powertrain to provide a fluid coupling for transmission of the rotation force. Additionally, a lockup clutch may be operatively associated with the torque converter to provide a rigid coupling for transmission of the rotational force. To selectively switch operation between the torque converter and the lockup clutch, a hydraulic circuit may be included with the machine. A hydraulic fluid source supplies pressurized hydraulic fluid for the hydraulic circuit. Downstream of the torque converter is an outlet regulator with a hydraulic cooler downstream of the outlet regulator. The hydraulic circuit also includes a diverter valve in fluid communication with the hydraulic fluid source and disposed to selectively direct pressurized hydraulic fluid between the torque converter and the lockup clutch to selectively engage and disengage the lockup clutch.

In yet another aspect, the disclosure describes a method of transmitting rotational force through a powertrain. The method generates a rotational force in a prime mover that is coupled to a driven element through the powertrain. The method operates the powertrain in a lockup mode in which a lockup clutch operatively associated with the torque converter provides a rigid coupling for transmitting the rotational force between the prime mover and the driven element. During lockup mode, pressurized hydraulic fluid flowing in the torque converter is directed to an outlet regulator configured to maintain a predetermined hydraulic pressure in the torque converter. The method can switch operation of the powertrain to a hydrodynamic mode in which the torque converter provides a fluid coupling for transmitting rotational force between the prime mover and the driven element.

In yet another aspect, the disclosure describes a hydraulic circuit for operating a torque converter associated with a lockup clutch. The hydraulic circuit includes a hydraulic fluid source supplying pressurized hydraulic fluid for the circuit and an outlet regulator located downstream of the torque converter which is configured to maintain a predetermined hydraulic pressure in the torque converter. The hydraulic circuit also includes a return line downstream of the outlet regulator. The hydraulic circuit further includes a diverter valve that is configured to selectively direct pressurized hydraulic fluid from the hydraulic fluid source to one of the torque converter and the lockup clutch.

DETAILED DESCRIPTION

Figure 1:
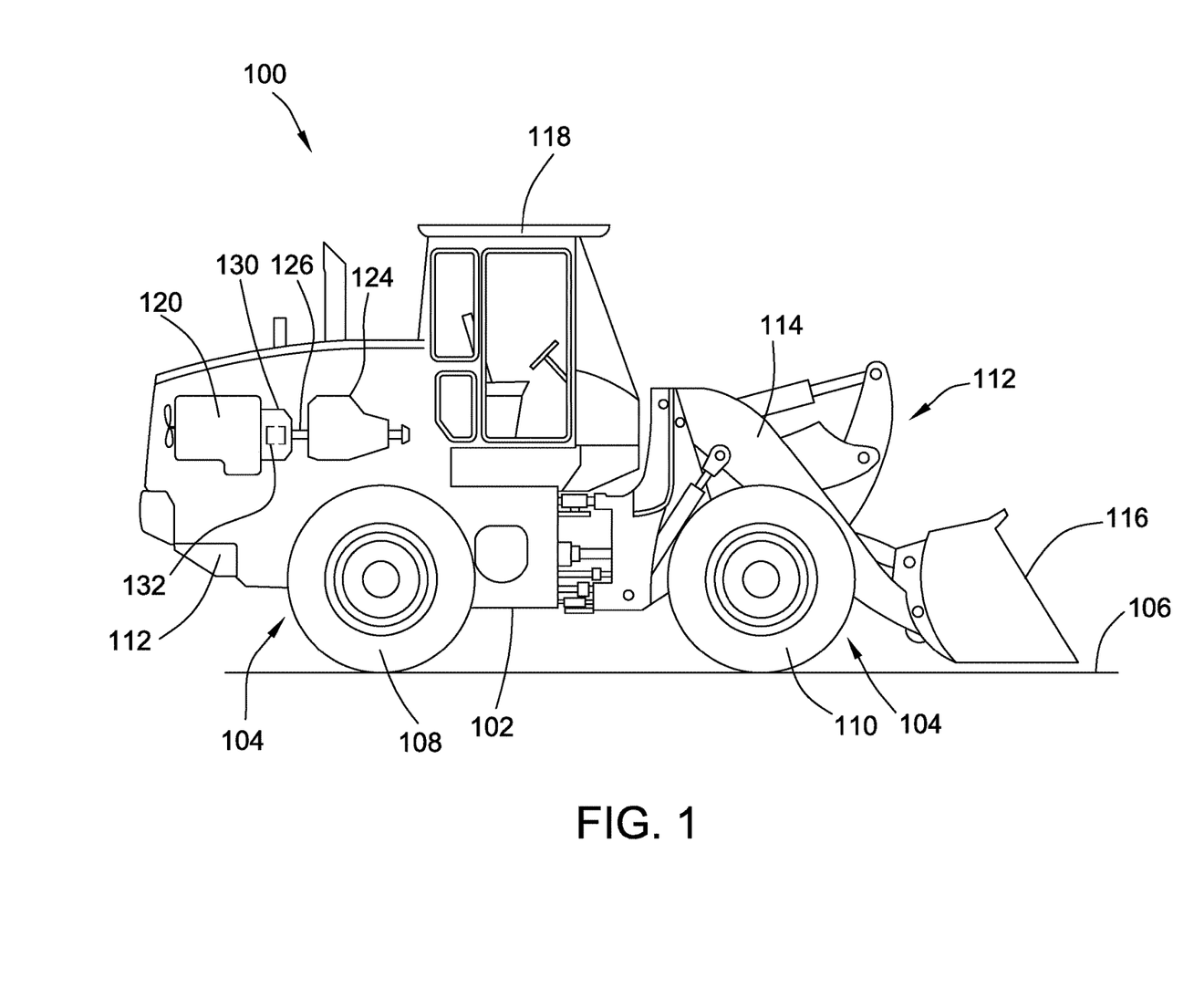
FIG. 1 is a side elevational view of a representative machine, in particular, a wheel loader, with a powertrain including a hydraulically actuated torque converter operatively associated with a lockup clutch and constructed in accordance with the present disclosure.

This disclosure relates to torque converters and related devices for transmitting rotational power in a powertrain and specifically to a hydraulic system or circuit for operating the torque converter. Referring to FIG. 1, there is illustrated an embodiment of a machine in which the disclosed torque converter may be included as part of the powertrain that transmits rotational power from the prime mover to the load or driven elements of the machine. While the arrangement is illustrated in FIG. 1 specifically in connection with a wheel loader 100, the arrangement disclosed herein has universal applicability in various other types of machines as well. The term "machine" may refer to any mobile or stationary machine that performs some type of operation associated with an industry such as mining, construction, farming, transportation, or any other industry known in the art. For example, the machine may be a mobile machine such as an earth-moving machine, such as an excavator, dump truck, backhoe, motor grader, material handler or the like, or may be a stationary application such as a generator set or a geohydrological pumping application. Moreover, an implement may be connected to the machine. Such implements may be utilized for a variety of tasks, including, for example, loading, compacting, lifting, brushing, and include, for example, buckets, compactors, forked lifting devices, brushes, grapples, cutters, shears, blades, breakers/hammers, augers, and others.

In the illustrated embodiment, the wheel loader 100 can be built on a chassis or frame 102 that is supported on a plurality of traction components 104 for movement over a terrain or work surface 106 located at a worksite. In the specific embodiment of a wheel loader 100, the traction components 104 include drive wheels 108 and steer wheels 110 that are rotatable with respect to the frame 102. The drive wheels 108 are power-driven to propel the wheel loader 100 over the work surface 106 and the steer wheels 110 can turn with respect to the frame 102 to change the direction of the wheel loader. However, in other embodiments, the traction components 104 can be of other styles such as continuous tracks or caterpillar tracks. To further facilitate maneuverability of the wheel loader 100 about the worksite, the frame 102 can be an articulated frame with a two-part construction but, in other embodiments, may have a more rigid construction. For performing operations about the worksite, the wheel loader 100 can include one or more work implements 112 connected to the frame 102 such as, for example, a lift arm 114 and an associated bucket 116. The lift arm 114 and bucket 116 may be power-operated to lift, haul, and dump materials. The power-operated or power-assisted equipment of the wheel loader 100 such as the drive wheels 108 and the work implements 112 may be collectively referred to as the driven elements or load of the machine. Maneuvering and operation of the wheel loader 100 may be directed from an operator's station 118 or cab situated above the frame 102.

To generate and provide power for the power-operated equipment including the driven elements, the wheel loader 100 can include an internal combustion engine 120 that functions as the prime mover in relation to the associated equipment and components. The internal combustion engine 120, such as a diesel-burning compression ignition engine or gasoline-burning spark ignition engine, combusts a hydrocarbon-based fuel to convert the chemical potential energy therein to usable mechanical or motive forces, typically in the form of rotational motion output from the engine. In addition to being an internal combustion engine, other examples of prime movers include gas-burning turbines, hybrid engines, electric motors, and the like. To mechanically connect the internal combustion engine 120 with the powered equipment including the drive wheels 108 and the work implement 112, the wheel loader 100 can include a powertrain 122 that distributes the rotational output of the engine throughout the wheel loader. The powertrain 122 can include other components such as transmissions, differentials, clutches, universal joints, power take offs, and the like to adjust the rotational speed, and relatedly the rotational force or torque, of the output and direct it to different parts of the wheel loader 100.

For example, to accommodate relative speed differences between the internal combustion engine 120 and the powered elements, the transmission 124 can be coupled to and receive the rotational output from the internal combustion engine 120 from a rotating shaft 126. The transmission 124 includes a number of selectively engagable gear ratios that can change the rotational speed and, in an inverse manner, the torque transmitted through the powertrain 122. Accordingly, the internal combustion engine 120 can operate at its most efficient speed ranges and the rotational output adjusted through the transmission 124 to correspond to the speed requirements of the driven elements. The gears in the transmission 124 may be arranged in fixed, determinative ratios although in other embodiments the transmission can be a continuously variable transmission that operates over a continuous range of speed differences.

To accommodate further speed variation between the internal combustion engine 120 and the other components attached to the powertrain 122, the powertrain can include a torque converter 130 disposed between the engine, where it can attach to the crankshaft, and the transmission 124. In particular, the torque converter 130 provides a fluid coupling that can accommodate relative acceleration or deceleration between the components and can effectively isolate the internal combustion engine 120 from direct mechanical connection with the rest of the powertrain 122. However, as mentioned above, when the rotational speeds of the internal combustion engine 120 and powertrain 122 are synchronized, the torque converter 130 can be operatively associated with a lockup clutch 132 that, when actuated, provides a rigid mechanical connection between the engine and transmission 124.

Figure 2:
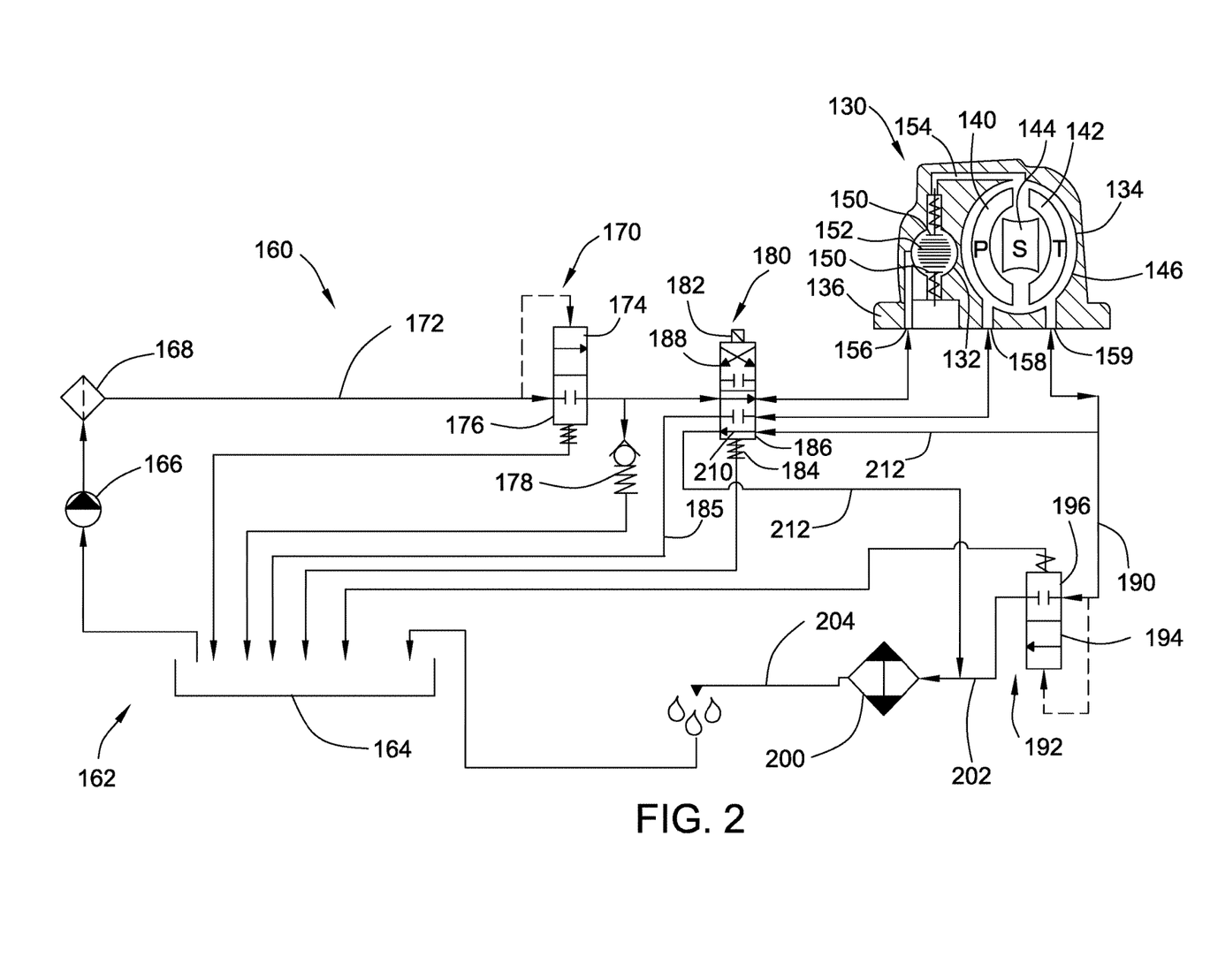
FIG. 2 is a schematic diagram of the hydraulic system for operating the torque converter and the associated lockup clutch of FIG. 1.

Referring to FIG. 2, there is illustrated an embodiment of the torque converter 130 in which the lockup clutch 132 is integrally formed with the rest of the internal components of the torque converter and joined together in a manifold casing 136 or housing. However, in other embodiments, the torque converter and the lockup clutch may be physically separate and arranged to operate in cooperation with each other. In addition to the lockup clutch 132, the torque converter 130 in FIG. 2 may include a converter portion 134 that performs the functions of the fluid coupling. In an embodiment, the converter portion 134 can include an impeller 140, a turbine 142, and a stator 144 disposed within a sealed housing 146 that can be filled with hydraulic fluid. The impeller 140 and the turbine 142 can be arranged in an opposing relationship and the stator 144 disposed between them. Moreover, the impeller 140 can be directly or indirectly coupled to and rotatable with the crankshaft of the internal combustion engine and the turbine 142 can be directly or indirectly coupled to and rotatable with the transmission input shaft. Rotating the impeller 140 within the housing 146 by corresponding rotation of the engine causes the hydraulic fluid therein to circulate in a manner that can drive the turbine 142 in the same direction thus spinning the shaft to the transmission. The converter portion 134 converts kinetic mechanical energy from the engine to dynamic fluid power and back to mechanical energy. In addition, the stator 144 can include nozzles or fins that facilitate circulation of the hydraulic fluid in a manner that increases the torque transfer through the torque converter to assist acceleration or handling of significant loads.

While the converter portion 134 allows for rotational speed differences, or slip, between the impeller 140 and the turbine 142, that can be dispersed in the hydraulic fluid, the lockup clutch 132 provides for a rigid mechanical connection that does not allow for significant slip. The lockup clutch 132 can be a hydraulically activated device that overrides the converter portion 134 when engaged while allowing for power transmission through the converter portion when disengaged. In an embodiment, the lockup clutch 132 can be configured as a piston-implemented device in which one or more pistons 150 are arranged to move a plurality of clutch plates 152 into and out of frictional engagement with each other. Furthermore, the pistons 150 may be spring loaded so the pistons normally move the clutch plates into engagement in the absence of a counterforce and only disengage the clutch plates when pressurized hydraulic fluid is directed into the lockup clutch 132 to overcome the spring rates of the piston springs. Hence, in contrast to conventional clutches, pressurization of the lockup clutch 132 disengages it.

Since the lockup clutch 132 and the converter portion 134 are both hydraulic devices relying on the presence of hydraulic fluid, the torque converter 130 can be configured to utilize the same internal hydraulic system. In particular, the lockup clutch 132 and converter portion 134 are disposed in fluid communication with each other within the manifold casing 136 via a fluid connection 154 so that the relative hydraulic pressure in the two components collaborate. For example, if the hydraulic pressure in the lockup clutch 132 is sufficiently high to overcome the spring-loaded pistons 150 and disengage the clutch plates 152, the converter portion 134 becomes the responsible component for transmitting rotational power through the torque converter 130. The pressurized hydraulic fluid responsible for disengaging the clutch plates 152 can also flow into the converter portion 134 via the fluid connection 154 to enable operation of the converter portion 134. Operating the torque converter 130 in this mode may be referred to as hydrodynamic mode. In contrast, if the hydraulic pressure in the converter portion 134 is increased relative to the lockup clutch 132, the spring-loaded pistons 150 can again move the clutch plates 152 into frictional engagement and the lockup clutch 132 overrides the converter portion 134 as the primary power transmission component. Operating the torque converter 130 when the lockup clutch 132 is engaged may be referred to as lockup mode.

To supply pressurized hydraulic fluid for operation of the torque converter 130, the torque converter can be operatively associated with a hydraulic circuit 160 made of various hydraulic components to manipulate and direct hydraulic fluid therein to and from the torque converter. To fluidly connect the torque converter 130 with the hydraulic circuit 160, the manifold casing 136 may include a lockup port 156 in direct fluid communication with the lockup clutch 132, a converter inlet port 158 that directs hydraulic fluid to the impeller side of the converter portion 134, and a converter outlet port 159 that directs hydraulic fluid out of the converter portion. The ports can connect with the hydraulic circuit with flexible hoses or rigid tubing to receive or discharge the hydraulic fluid.

To supply the hydraulic fluid that can be directed to the torque converter 130, the hydraulic circuit 160 can include a hydraulic fluid source 162 that provides a source of pressurized hydraulic fluid. To accommodate the hydraulic fluid prior to pressurization, the hydraulic fluid source 162 includes a tank or hydraulic reservoir 164 that contains a volume of relatively low pressure hydraulic fluid and that may be vented to the atmosphere or may be enclosed so that the contents can be maintained in a slightly pressurized state. The hydraulic fluid can be of any suitable type of incompressible fluid and may have a sufficient viscosity to enable the fluid to readily flow in the hydraulic circuit. Because the hydraulic fluid flowing in the hydraulic circuit originates from the hydraulic reservoir 164, the reservoir may be considered as the upstream most position in the hydraulic circuit. The hydraulic reservoir 164 can also be disposed in a location on the machine where it functions as a sump to which hydraulic fluid is returned from several different hydraulic lines. The hydraulic reservoir 164 may supply hydraulic fluid to other components on the machine in addition to the torque converter.

To pressurize and direct the hydraulic fluid from the hydraulic reservoir 164 through the hydraulic circuit 160, the hydraulic fluid source 162 includes a hydraulic pump 166 disposed in fluid communication with the reservoir. The hydraulic pump 166 can be any suitable type of pump for pressurizing and positively displacing hydraulic fluid to flow in a circuit, including piston pumps, rotary gear pumps, vane pumps, gerotor pumps, swash plates, and the like. The hydraulic pump 166 may be a fixed displacement pump as indicated, or a variable displacement pump capable of changing or adjusting the output volume or flow rate the pump. Further, the hydraulic pump 166 may be reversible to enable flow both to and from the hydraulic reservoir 164. To drive the hydraulic pump 166, it can be operatively coupled with the powertrain to receive part of the power output from the internal combustion engine. To filter the hydraulic fluid, the hydraulic fluid source 162 may also include a hydraulic filter 168 disposed downstream of the hydraulic pump 166.

Because the hydraulic pressure produced by the hydraulic pump 166 may be larger than is required to operate the torque converter 130 and may fluctuate due to operation of the pump, the hydraulic circuit 160 can include a regulating valve 170 in fluid communication with and downstream of the hydraulic fluid source 162. The regulating valve 170 is connected into a supply line 172 from the hydraulic fluid source 162 and can be a two position flow control valve with an open position 174 and a closed position 176 that respectively can open and close the supply line. The regulating valve 170 can be pilot operated based on hydraulic pressure in the supply line 172 and can be set to maintain a consistent hydraulic pressure in the supply line. In addition to the regulating valve, the hydraulic circuit 160 can include a pressure relief valve 178 in fluid communication with the supply line 172 that can be set to open in the event the hydraulic pressure exceeds the capacity of the torque converter 130. The pressure relief valve 178 can be a spring-actuated, one-way valve in fluid communication with the hydraulic reservoir 164 with the spring calibrated to open the valve at a preset pressure to drain a portion of the pressurized hydraulic fluid in the supply line. In other embodiments, different methodologies such as flow restrictors and the like may be utilized to regulate the hydraulic pressure and flow from the hydraulic fluid source 162.

To selectively direct pressurized hydraulic fluid to and from the torque converter 130, and thereby regulate operation of the torque converter, the hydraulic circuit 160 can include a diverter valve 180 installed in the supply line 172 downstream of the regulating valve 170 and pressure relief valve 178 and upstream of the torque converter. In an embodiment, the diverter valve 180 can be a solenoid operated spool valve including an electromagnetic solenoid 182 that is actuated to change the position of an internal spool biased against a spring 184, however in other embodiments, the diverter valve can be constructed and actuated by different methods, such as a hydraulically actuated valve. When the solenoid 182 is electromagnetically activated, the solenoid moves or configures the spool to seal and unseal various ports disposed in the diverter valve 180 that are in fluid communication with the torque converter 130 and various other components of the hydraulic circuit 160. For example, to direct hydraulic fluid to the hydraulic reservoir 164, the diverter valve 180 can be connected with a drain line 185 in direct or indirect fluid communication with the reservoir.

In the illustrated embodiment, the diverter valve 180 can be a two position directional control valve having a first position 186 and a second position 188 that can be moved into and out of alignment with the supply line 172. The first position 186 can be configured to place the supply line 172 in fluid communication with the lockup port 156 disposed in the torque converter 130 to direct pressurized hydraulic fluid into the hydraulic clutch. In addition, the first position 186 effectively seals the converter inlet port 158. Thus, in the first position, the diverter valve 180 raises the hydraulic pressure in the lockup clutch 132 to disengage the clutch plates 152 so the converter portion 134 is responsible for transmitting power through the powertrain and the torque converter 130 is operating in hydrodynamic mode. To switch operation to lockup mode, the second position 188 of the diverter valve 180 is configured to establish fluid communication between the supply line 172 and the converter inlet port 158 so the converter portion 134 receives the pressurized hydraulic fluid. Further, the second position places the lockup port 156 in fluid communication with the drain line 185 to drain hydraulic fluid from the lockup clutch 132. Accordingly, with hydraulic pressure in the converter portion 134 being greater than in the lockup clutch 132, the clutch plates 152 move into frictional contact and the lockup clutch engages.

To ensure hydraulic fluid moves through the torque converter 130, for example, to prevent temperature or pressure from exceeding acceptable values, the hydraulic circuit 160 can include an outlet line 190 connected to the converter outlet port 159. The outlet line 190 can remove hydraulic fluid from the converter portion 134 whether the torque converter 130 is operating in hydrodynamic mode or in lockup mode. However, to prevent the hydraulic fluid in the converter portion 134 from draining to an unacceptable level such as, for example, when operating in lockup mode and the hydraulic pressure in the converter portion 134 must exceed hydraulic pressure in the lockup clutch 132, an outlet regulator 192 may be disposed in the outlet line 190 downstream of the torque converter 130. In an embodiment, the outlet regulator 192 can be a two position flow control valve including a first position 194 opening the valve and a second position 196 closing the valve. The outlet regulator 192 can be configured as a pilot actuated valve that switches between the first position 194 and the second position 196 based on the hydraulic pressure in the outlet line 190. In particular, the outlet regulator 192 can be configured to maintain a predetermined hydraulic pressure in the torque converter 130 to ensure there is sufficient hydraulic fluid and pressure maintained in the torque converter for operation. The predetermined pressure can assist in reducing the chance of slippage when the clutch plates are frictionally engaged or maintain the clutch plates in a spaced apart relation when disengaged. In other embodiments, the outlet regulator can be an orifice or a flow restrictor configured to impede hydraulic discharge from the torque converter and thereby maintain the hydraulic pressure therein.

Because the hydraulic fluid received from the torque converter 130 may be at an elevated or heightened temperature, the hydraulic circuit 160 can include an optional hydraulic cooler 200 disposed downstream of and in fluid communication with the outlet regulator 192 via a cooler line 202. The hydraulic cooler 200 can be any suitable type of heat exchanger for cooling the hydraulic fluid and may be configured in a water cooled design, an air cooled design, or any other suitable type of design. To return the cooled hydraulic fluid to the hydraulic reservoir 164, the hydraulic cooler 200 can be connected to a return line 204 that may have additional devices and components to treat the hydraulic fluid returning to the reservoir. The hydraulic cooler may be omitted in other embodiments in which fluid temperature is not a significant concern and the return line 204 directly communicates with the outlet regulator 192. In addition, various other hydraulic components and systems may be disposed in the return line 204 upstream of the hydraulic reservoir.

Because of its configuration, the outlet regulator 192 may be able to maintain the predetermined hydraulic pressure in the torque converter 130 only within a limited range. The limited range of predetermined hydraulic pressure may not be optimal or suitable for operating the torque converter in both the hydrodynamic mode and the lockup mode. Accordingly, in a further embodiment, the hydraulic circuit 160 can be configured to establish hydraulic flow and pressure across the torque converter 130 in a manner to facilitate operation in both modes. In particular, the hydraulic circuit can be configured to bypass the outlet regulator 192 under certain circumstances so that hydraulic fluid can be directed from the torque converter 130 to the hydraulic cooler 200 or to the return line 204 in absence of the hydraulic cooler. To bypass the outlet regulator 192, the diverter valve 180 can include a bypass passage 210 disposed in the first position 186. When the first position 186 is moved into the active position of the diverter valve 180, the bypass passage 210 communicates with a bypass line 212 that intersects the outlet line 190 upstream of the outlet regulator 192 and connects to either the cooler line 202 or the return line 204 downstream of the outlet regulator. Hence, when operating in hydrodynamic mode, the diverter valve 180 via the bypass passage 210 establishes fluid communication directly between the converter outlet port 159 in the torque converter 130 and the hydraulic cooler 200 by bypassing the outlet regulator 192.

INDUSTRIAL APPLICABILITY

Figure 3:
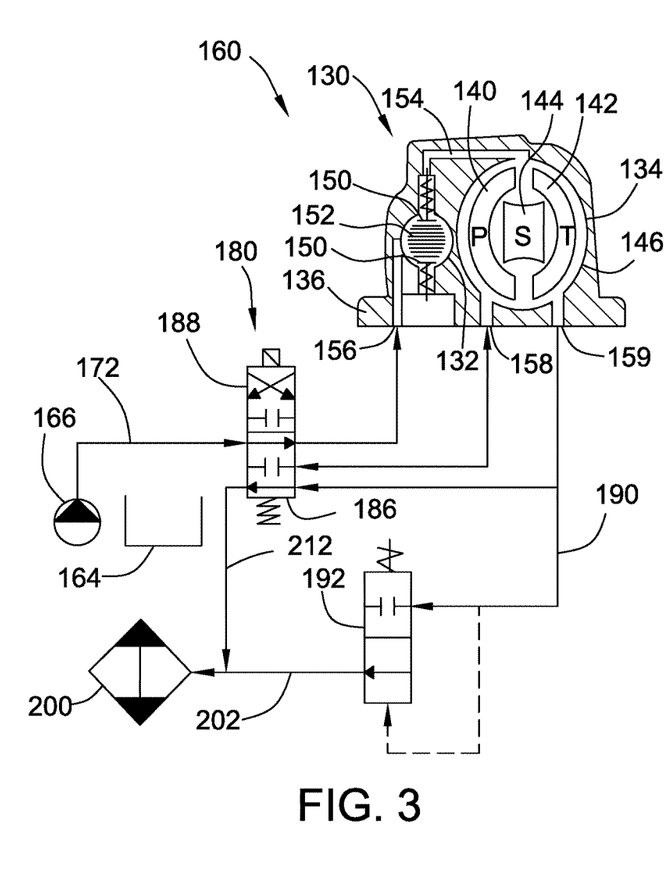
FIG. 3 is a simplified version of the schematic diagram of FIG. 2 illustrating the hydraulic system as configured to operate in a hydrodynamic mode in which power transmission primarily occurs through the torque converter.
Figure 4:
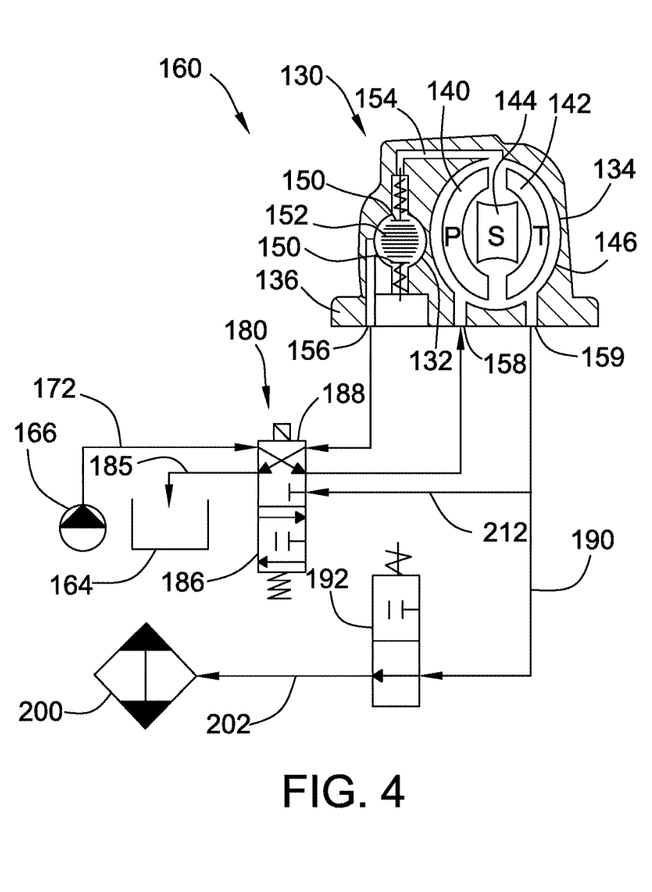
FIG. 4 is the simplified schematic diagram illustrating the hydraulic system as configured to operate in a lockup mode mode in which power transmission primarily occurs through the lockup clutch.

The disclosure describes a hydraulic circuit 160 that can operate a torque converter 130 disposed in the powertrain of a machine in different operating modes. Referring to FIGS. 3 and 4, there is illustrated the different flow arrangements for pressurized hydraulic fluid in the hydraulic circuit 160 in the hydrodynamic mode and in the lockup mode. In the hydrodynamic mode, depicted in FIG. 3, the diverter valve 180 is configured in the first position 186 and directs pressurized hydraulic fluid via the supply line 172 from the hydraulic pump 166 associated with the hydraulic fluid source to the lockup port 156 on the torque converter 130. The hydraulic pressure in the lockup clutch 132 is therefore sufficient to disengage the clutch plates 152 and the torque converter 130 operates in hydrodynamic mode. The hydraulic fluid flows into the converter portion 134 through the fluid connection 154 to enable the impeller 140 and turbine 142 to interact. Because the hydraulic fluid accommodates any rotational speed differential between the impeller 140 and the turbine 142 as friction and heat, the temperature of the hydraulic fluid may rise significantly. Accordingly, in a further embodiment, to facilitate the consistent flow of pressurized hydraulic fluid through the torque converter 130 and prevent overheating, the bypass line 212 and the bypass passage 210 in the diverter valve 180 divert a portion of the hydraulic fluid discharged from the converter outlet port 159 directly to the hydraulic cooler 200 by bypassing the outlet regulator 192. The bypass line 212 thus increases the hydraulic flow through the torque converter 130 to maintain the temperature in the converter. Directing hydraulic fluid to bypass the outlet regulator 192 and freely discharge into the hydraulic cooler 200 or, alternatively, to the return line ultimately communicating with the hydraulic reservoir 164 also prevents hydraulic pressure in the converter portion 134 from exceeding the hydraulic pressure in the lockup clutch 132 that could unintentionally engage the lockup clutch.

Referring to FIG. 4, when the torque converter 130 is operating in lockup mode, the diverter valve 180 directs pressurized hydraulic fluid directly into the converter portion 134 via the converter inlet port 158 disposed into the manifold casing 136. The second position 188 also drains hydraulic fluid in the lockup clutch 132 directly to the hydraulic reservoir 164. As stated above, reducing the hydraulic pressure in the lockup clutch 132 relative to the hydraulic pressure in the converter portion 134 causes the clutch plates 152 to engage so the lockup clutch is responsible for transmitting torque through the torque converter 130. To maintain the pressure differential between the lockup clutch and the converter portion 134, the converter outlet port 159 is disposed in direct fluid communication with the outlet regulator 192 via the outlet line 190. The outlet regulator 192 thereby regulates and maintains the predetermined hydraulic pressure in the converter portion 134 of the torque converter 130 so that the lockup clutch 132 remains engaged.

Accordingly, the diverter valve 180 as configured with a bypass passage 210 in the first position 186 can selectively direct pressurized hydraulic fluid through the hydraulic circuit 160 to regulate operation of the torque converter 130 in both hydrodynamic mode and lockup mode with the following characteristics and results:

| Mode | Hydrodynamic Mode | Lockup Mode |
|---|---|---|
| Flow entering Torque Converter | Diverter Valve → Lockup Port | Diverter Valve → Converter Inlet |
| Flow exiting Torque Converter | Converter Outlet → Cooler | Converter Outlet → Outlet Regulator |
| Outlet Regulator Status | Bypassed | Regulating Hydraulic Pressure |
| Lockup Clutch Status | Disengaged | Engaged |

A possible advantage of the foregoing disclosure is that a diverter valve, which may be configured with a bypass passage, can facilitate switching operation of a torque converter operatively associated with a lockup clutch between operation in a hydrodynamic mode and a lockup mode. For example, a predetermined hydraulic pressure in the torque converter necessary for engaging the lockup clutch can be maintained by an outlet regulator disposed in fluid communication with the converter outlet port. However, the diverter valve can selectively bypass the outlet regulator during hydrodynamic mode to prevent hydraulic pressure and temperature from building up in the torque converter. These and other advantages and features of the disclosure should be apparent to those of ordinary skill in the art from the above description and the accompanying drawings.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:
1. A machine comprising:
a prime mover for generating a rotational force;
a driven element operatively coupled to the prime mover through a powertrain;
a torque converter disposed in the powertrain, the torque converter providing a fluid coupling for transmission of the rotational force;
a lockup clutch operatively associated with the torque converter, the lockup clutch providing a rigid coupling for transmission of the rotational force; and a hydraulic circuit operatively associated with the torque converter and the lockup clutch, the hydraulic circuit including:

a hydraulic fluid source supplying pressurized hydraulic fluid;

an outlet regulator disposed downstream of and in fluid communication with the torque converter; and a diverter valve in fluid communication with the hydraulic fluid source and disposed to selectively direct pressurized hydraulic fluid from the hydraulic fluid source between the torque converter and the lockup clutch to selectively engage and disengage the lockup clutch, the diverter valve further includes a bypass passage to selectively establish fluid communication between the torque converter and a return line.

2. The machine of claim 1, wherein the return line is disposed downstream of and in fluid communication with the outlet regulator and disposed to bypass the outlet regulator.

3. The machine of claim 2, wherein the diverter valve directs pressurized hydraulic fluid to the lockup clutch to disengage the lockup clutch and directs pressurized hydraulic fluid to the torque converter to engage the lockup clutch.

4. The machine of claim 3, wherein the diverter valve bypasses the outlet regulator only when the lockup clutch is disengaged.

5. The machine of claim 4, wherein the outlet regulator is configured to maintain a predetermined hydraulic pressure in the torque converter when the lockup clutch is engaged.

6. The machine of claim 5, wherein the diverter valve communicates with a drain line to drain the lockup clutch to a hydraulic reservoir when the lockup clutch is engaged.

7. The machine of claim 6, wherein the torque converter is integrally combined with the lockup clutch and includes a lockup port directing pressurized hydraulic fluid to and from the lockup clutch; a converter inlet port directing pressurized hydraulic fluid to a converter portion of the torque converter, and converter outlet port directing pressurized hydraulic fluid from the converter portion of the torque converter.

* * * * *